United States Patent
Toelge

(10) Patent No.: US 7,434,894 B2
(45) Date of Patent: Oct. 14, 2008

(54) METHOD AND DEVICE FOR CONTROLLING THE BRAKE SYSTEM OF A VEHICLE

(75) Inventor: Thomas Toelge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/461,454

(22) Filed: Jun. 16, 2003

(65) Prior Publication Data

US 2003/0222498 A1    Dec. 4, 2003

Related U.S. Application Data

(63) Continuation of application No. PCT/EP01/12961, filed on Nov. 9, 2001.

(30) Foreign Application Priority Data

Dec. 16, 2000   (DE) ............... 100 62 978

(51) Int. Cl.
*B60T 7/00* (2006.01)
*B60T 8/60* (2006.01)
(52) U.S. Cl. ............... 303/15; 303/155; 701/78
(58) Field of Classification Search ............ 303/3, 303/15, 145, 155, 159, DIG. 1, DIG. 2, DIG. 9; 701/70, 71, 78, 83; 180/271; 188/DIG. 1
See application file for complete search history.

(56) References Cited

U.S. PATENT DOCUMENTS

| 5,158,343 | A | * | 10/1992 | Reichelt et al. | .......... 303/113.4 |
| 5,492,397 | A | * | 2/1996 | Steiner et al. | ............... 303/157 |
| 5,727,852 | A | * | 3/1998 | Pueschel et al. | .......... 303/113.4 |
| 5,727,854 | A | * | 3/1998 | Pueschel et al. | ............. 303/155 |
| 6,120,110 | A | * | 9/2000 | Shimizu | .................. 303/113.4 |
| 6,129,423 | A | * | 10/2000 | Hashimoto | .................. 303/125 |

FOREIGN PATENT DOCUMENTS

| EP | 0867350 A2 | * | 9/1998 |
| JP | 8-301098 | | 11/1996 |

OTHER PUBLICATIONS

English translation of EP-0867350.*
Japanese Office Action dated Jul. 30, 2007 w/English translation.

* cited by examiner

*Primary Examiner*—Melody M Burch
(74) *Attorney, Agent, or Firm*—Crowell & Moring LLP

(57) ABSTRACT

A method and a device for controlling the brake system of a vehicle, wherein a stand-by phase is made available. The stand-by phase is initiated as soon as the input pressure exceeds a threshold value S1 and the rate of change of input pressure exceeds a third threshold value SB. The third threshold value SB is smaller than a second threshold value S2, which when exceeded immediately changes the braking operation into a full braking support operation. When the third threshold value SB is exceeded or when the stand-by phase is entered, the brake support system is activated or becomes ready to use, however, a full braking support operation is not triggered yet. During the stand-by phase, the braking behavior of the driver is continually monitored.

7 Claims, 7 Drawing Sheets

METHOD AND DEVICE FOR CONTROLLING THE BRAKE SYSTEM OF A VEHICLE

BACKGROUND OF THE INVENTION

This application claims the priority of Germany, filed Dec. 16, 2000, the disclosure of which is expressly incorporated by reference herein.

The present invention relates to a method and a device for controlling the brake system of a vehicle.

DE-A-195 24 939 suggests a method and a device for controlling the brake system of a vehicle in which an automatic braking operation is initiated when a threshold value is exceeded by the rate of change of the input pressure, wherein the threshold value becomes smaller as the potential for danger increases.

DE-A-197 12 859 describes a brake control system for motor vehicles. In this brake control system, a pressure sensor is provided for detecting the initial pressure and the initial pressure gradient. When the initial pressure exceeds a first threshold value and the initial pressure gradient a second threshold value, a control device switches into auxiliary control mode. In this auxiliary control mode, a quick pressure build-up in the wheel brake cylinder and thereby the maximum possible delay and shortest possible stopping distance are achieved.

In the described known methods, the braking operation is supported as a function of exceeding certain threshold values. That is, a clear limit is provided for initiating the braking support operation. Below this threshold no braking support operation is provided, and above this threshold a full-scale braking support operation occurs in emergency braking situations. The transition from a normal braking phase into the support phase occurs hereby suddenly. It is difficult to set or establish a suitable limit value. Too low a threshold value can trigger an emergency braking process even in non-critical situations that is not desired by the driver. Too high a threshold value in turn remains without effect if, for example, unskilled drivers in critical situations (or apparently non-critical situations) brake too timidly and therefore do not reach the threshold value, initiating no emergency braking operation at all or too late.

SUMMARY OF THE INVENTION

An object of the present invention to make available an improved method and an improved device for controlling the brake system of a vehicle.

The present invention has the basic idea of providing a stand-by phase for the braking support operation. If the driver maintains the pressure on the brake pedal, i.e. initially maintains the input pressure or even increases it slightly (i.e. rate of change of input pressure roughly 0 or positive) during the continued course of the braking process, the system moves into the full braking support function from the stand-by phase only when a fourth threshold value SA is exceeded for the rate of change of input pressure. In other words, as soon as the driver with an already built-up input pressure continues to operate the brake pedal further and hereby indicates that a stronger braking operation appears necessary, an emergency braking operation is triggered. If, however, during the stand-by phase it is noticed that the driver does not increase the pressure on the brake pedal any further, but decreases it (i.e., a decreasing tendency), then the emergency braking operation is not triggered and the brake system remains in the normal braking state.

The build-up of the input pressure occurs system-related in fast brake applications with overshooting, i.e. the input pressure increases more at the beginning of the braking operation than the wheel pressure. When upon the overshooting effect subsiding and the wheel pressure adjusting the driver continues to apply the brake pedal, the driver indicates, as described above, that greater braking power is required.

In an alternative embodiment, low-pass filtration of the input pressure signal takes place. This way, for example, overshooting in the input pressure signal can be filtered out at the beginning of the braking process. The transition from the stand-by phase into the trigger phase occurs in this embodiment when—over time—the unfiltered input pressure signal meets with the filtered input pressure signal and the driver continues to increase the input pressure.

In another alternative embodiment, an upper threshold value $S_o$ is specified when the overshooting of the unfiltered input pressure signal subsides. The transition from the stand-by phase into the trigger phase then occurs when this upper threshold value $S_o$ is exceeded subsequently. Preferably a lower threshold value $S_u$ is also provided. When a value drops below this lower threshold value, the stand-by phase is completed. In a currently preferred configuration, the upper threshold value or the pressure dispersion range consisting of the upper and the lower threshold values is made available when, upon the overshooting of the unfiltered input pressure signal subsiding, the value drops below a certain gradient.

Pursuant to a fourth embodiment of the invention, in the stand-by phase of the braking support operation the change of rate of the input pressure is compared with a fourth threshold value SA after a predetermined time interval and as a function of exceeding this fourth threshold value SA, a full braking support operation is initiated.

In the control process of the brake system according to the present invention, the first threshold value S1 and/or the third threshold value SB can be set at relatively sensitive, i.e. relatively low, values for triggering the stand-by phase. This way, the brake system is already in the stand-by mode during apparently non-critical situations and has been sensitized to the possibility of changing into an emergency braking operation with a subsequent additional increase in the braking pressure, without taking the possibility of still being able to influence the braking or delay process during the stand-by phase away from the driver. The second threshold value S2 for immediate actuation of the emergency braking support system can then be set higher pursuant to the invention.

The fourth threshold value SA for the transition from the stand-by phase into the trigger phase is preferably set as a function of the pressure tendency and/or the braking behavior of several preceding computing cycles. Preferably a computing cycle takes place every 20 ms.

The increase in pressure on the wheel brakes preferably occurs when the necessity for an additional increase in pressure is deduced during the stand-by phase, initially in a build-up phase. The "build-up phase" is that in which the wheel pressure on the brakes is increased to the ABS control range with a (further) increasing rate of change of the input pressure.

Upon decreasing the input pressure by a certain value during the build-up phase, the operation switches to the metering phase, in which the wheel pressure runs proportional to the change of input pressure. This way, additional hydraulic support is made available to the driver during the metering phase, which he can influence directly with his braking behavior.

Alternative to increasing the pressure on the wheel brakes up into the ABS control range, the input pressure can also be passed on to the wheel brakes by the hydraulic system, elevated by a boosting factor. The boosting factor can be constant or variable as a function of the input pressure level upon trigger event.

The braking support system of the present invention offers the advantage that a transition range is made available to the driver during which he can decide whether he requires further braking support or whether the braking level reached at that point and the associated delay are sufficient.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
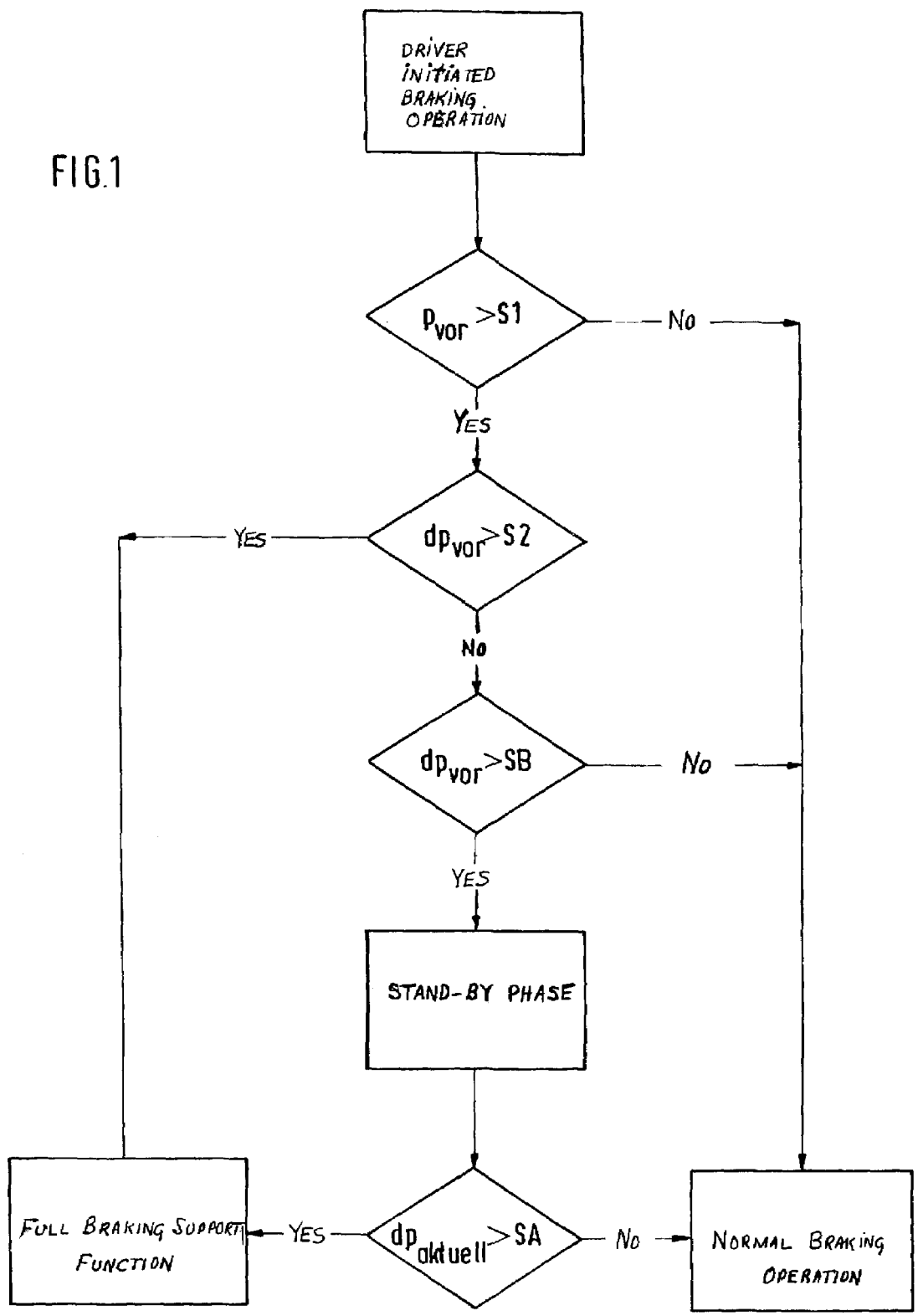
FIG. 1 is a flow chart of the brake system control device of the present invention.
Figure 2:
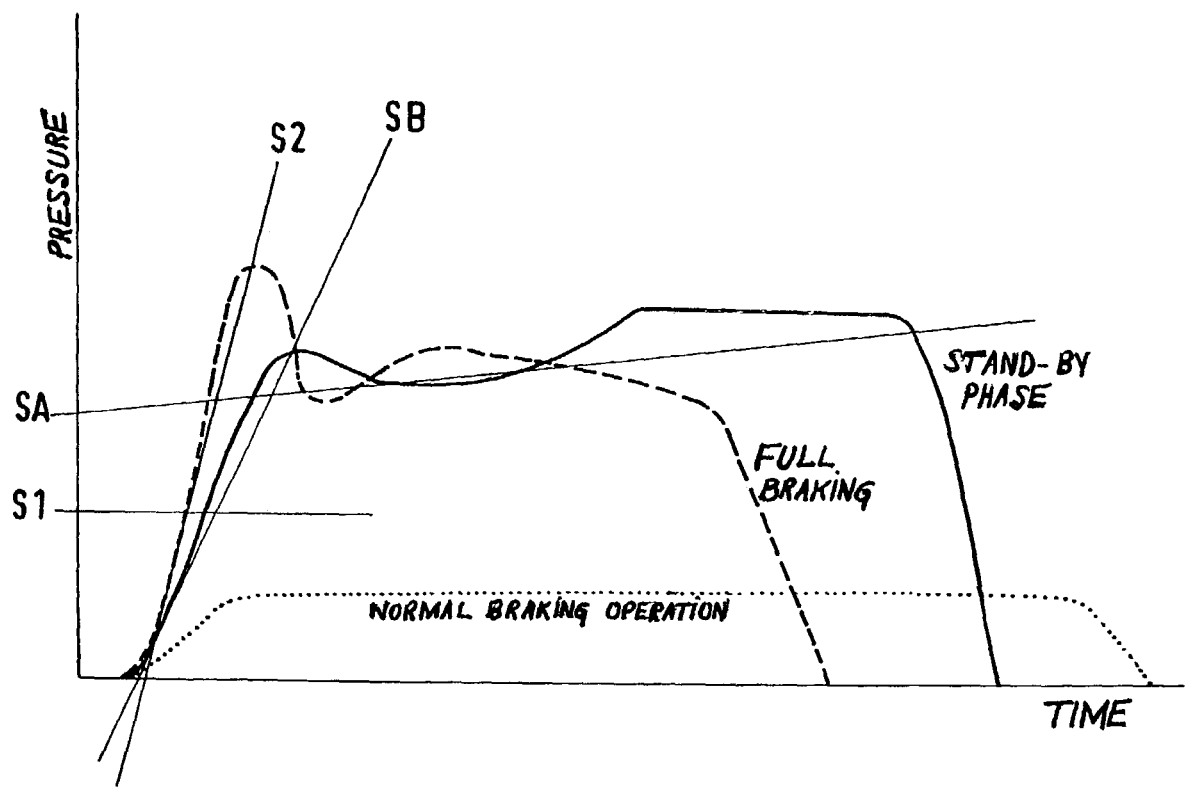
FIG. 2 is a graph of various braking pressure courses to depict the brake system control device of the present invention.
Figure 7:
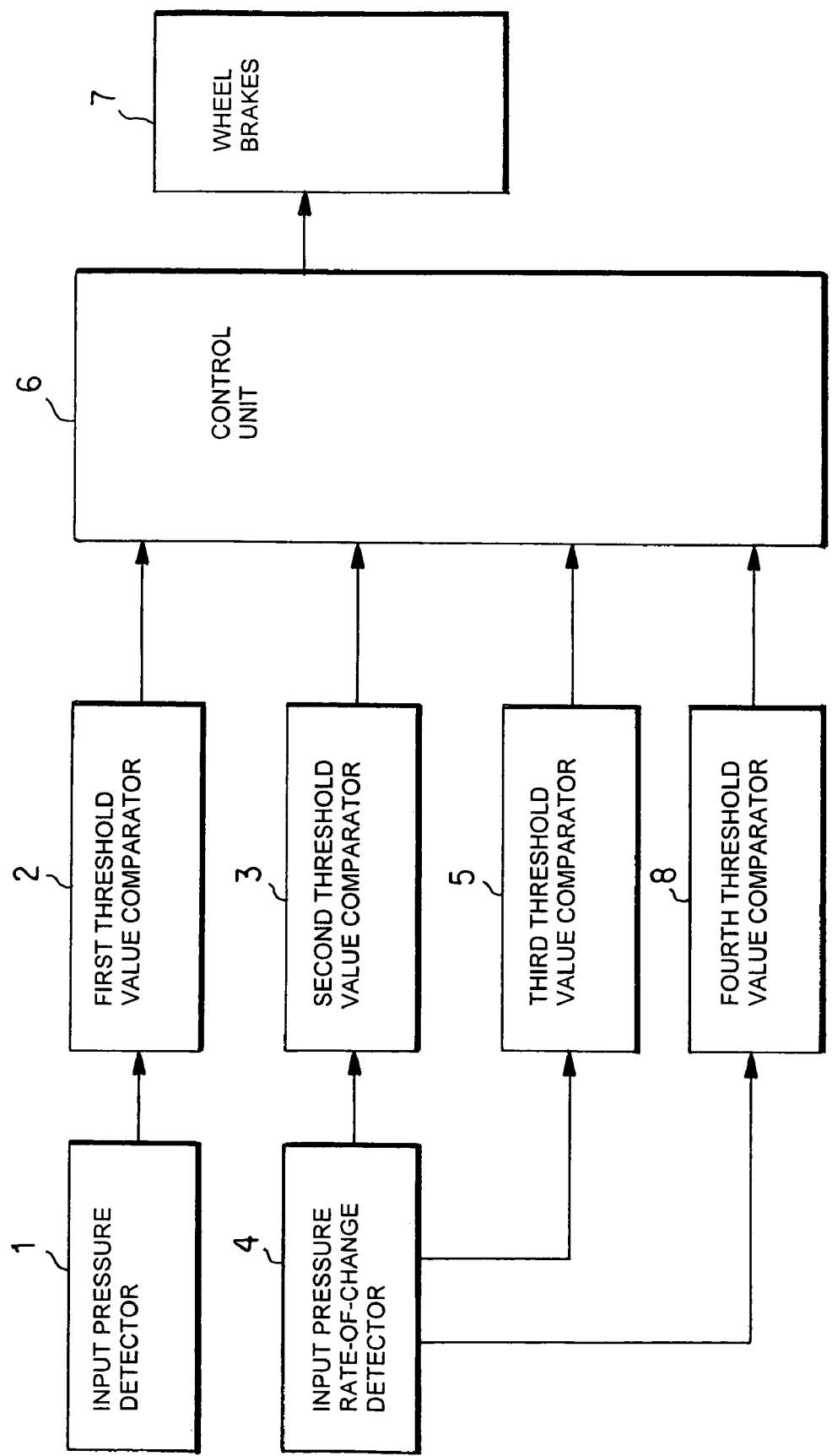
FIG. 7 is a schematic diagram showing the system for carrying and the method illustrated in the flow chart of FIG. 1.

FIG. 1 depicts operation of the brake system control device of the present invention shown schematically in FIG. 7. As soon as the driver initiates a braking operation, the input pressure $p_{vor}$ detected by the detector 1 is compared to a first threshold value S1 at the comparator 2 and supplied to a control unit 6. When this threshold value S1 is not exceeded by the input pressure specified by the driver, a normal braking operation takes place (see dotted curve in FIG. 2; right portion of FIG. 1). On the other hand, another query takes place when the input pressure exceeds the threshold value S1. This additional query is conducted by a second comparative device 3, which compares the rate of change of the input pressure $dp_{vor}$ from a rate-of-change detector 4 with the second threshold value S2 and outputs the result to the control unit 6. When the rate of change of the input pressure exceeds the threshold value S2, the brake system control device pursuant to the invention recognizes that the driver is performing an emergency braking operation and the full braking support function is activated (see dotted curve in FIG. 2; left portion of FIG. 1). When the rate of change of the input pressure $dpv_{or}$ does not exceed the second threshold value S2, a third comparative device 5 checks whether the rate of change of input pressure has already exceeded a third threshold value SB. The third threshold value SB supplied to the control unit 6 is lower than the threshold value S2. If the rate of change of input pressure is so low that even the third threshold value SB is not exceeded, then a normal braking operation is performed on the wheel brakes 7. On other hand, when the third threshold value SB is exceeded, the stand-by phase is initiated (see solid curve in FIG. 2). This braking curve typically is characterized by the fact that quick brake actuation initially causes an overshooting of the input pressure and the input pressure and wheel pressure are adjusted during further progression. If subsequently the rate of change of the input pressure $dp_{vor}$ exceeds the fourth threshold value SA, as determined by the fourth threshold value comparator 8, the full braking support operation is activated and the build-up phase for increased braking is initiated because exceeding the fourth threshold value SA indicates to the brake system control device that the driver is pressing the brake pedal further and would like more braking action (see FIG. 3). If, on the other hand, the rate of change of input pressure $dpv_{or}$ further decreases (i.e., decreasing tendency), the normal braking operation is maintained and the stand-by phase can be terminated.

Figure 3:
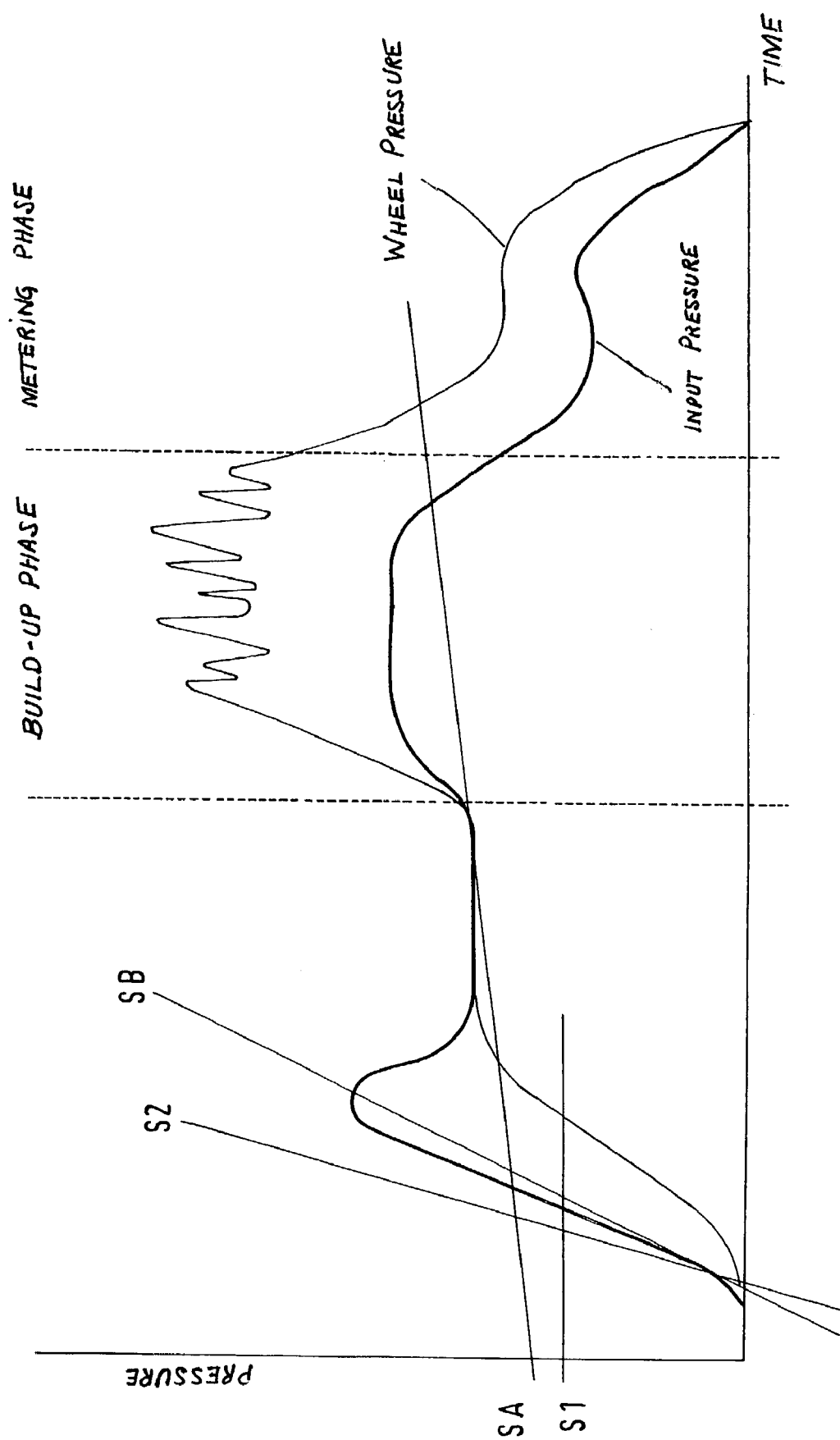
FIG. 3 is a graph of the course over time of the input pressure and the wheel pressure pursuant to a first embodiment of the invention.

FIG. 3 depicts how during the transition into the trigger phase initially in the build-up phase for increased braking action the wheel pressure on the brakes is increased to the ABS control range. If the driver then continues to decrease the input pressure, the transition into the metering phase occurs after a decrease of the input pressure by a certain value. In the metering phase, the wheel pressure runs proportional to the change in input pressure.

Figure 4:
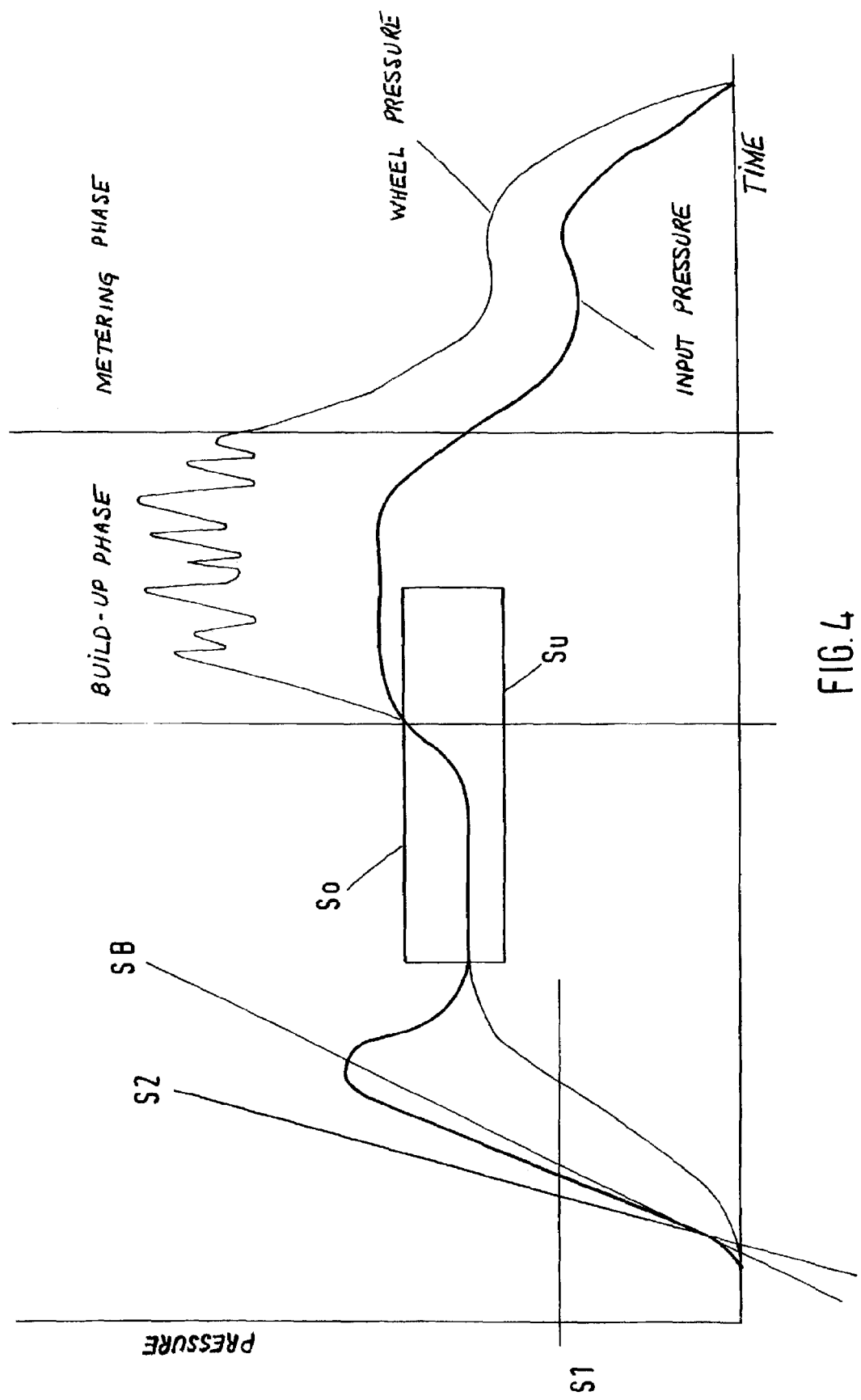
FIG. 4 is a graph of the course over time of the input pressure and the wheel pressure pursuant to another embodiment of the invention.
Figure 5:
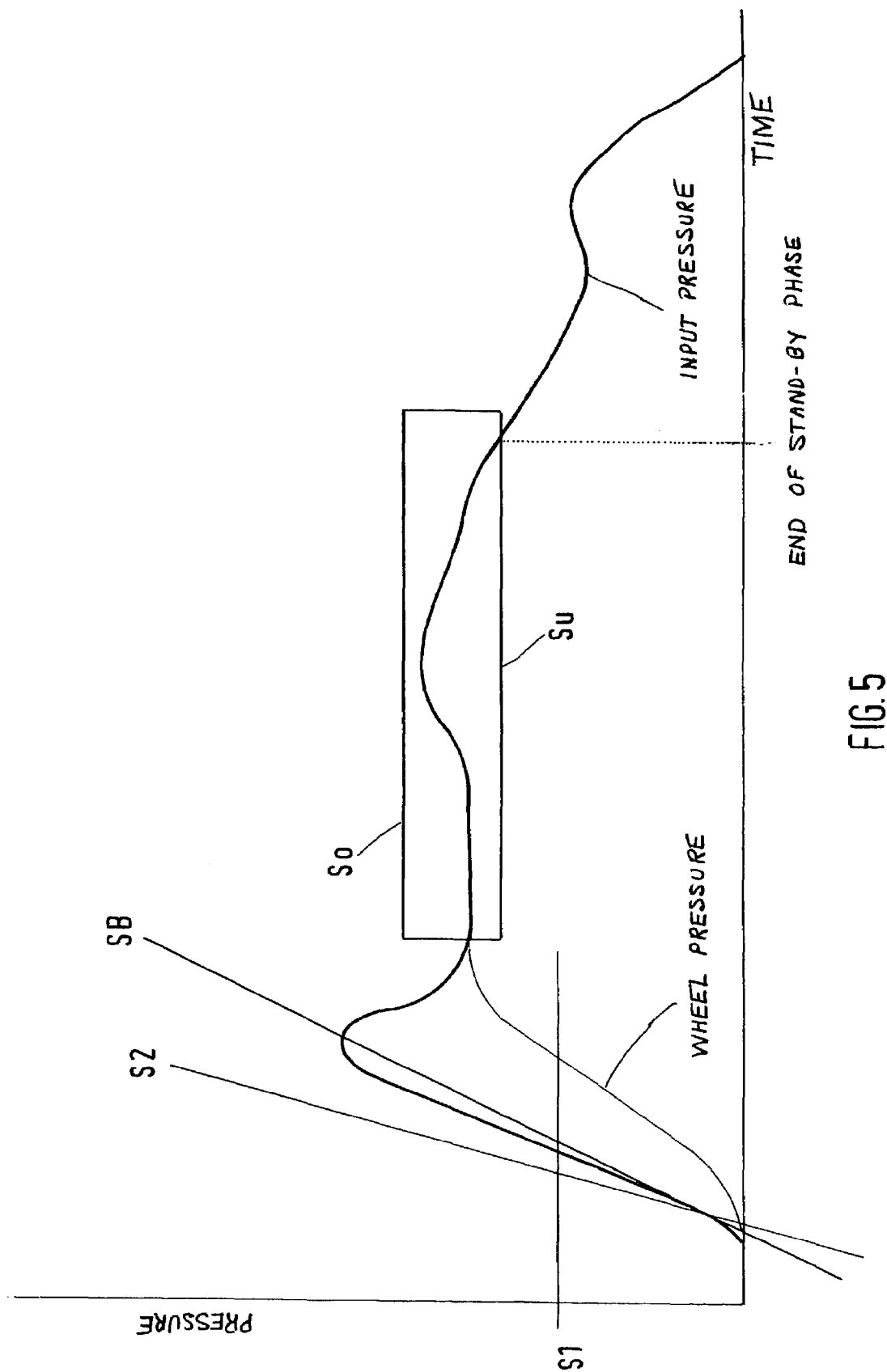
FIG. 5 is a graph of the course over time of the input pressure if the full braking support operation is not triggered.

FIG. 4 shows an embodiment pursuant to the invention in which a pressure dispersion range with an upper threshold value $S_o$ and a lower threshold value $S_u$ is specified. The transition from the stand-by phase into the trigger phase or build-up phase occurs when the input pressure exceeds the upper threshold value $S_o$. If the upper threshold value $S_o$ is not exceeded during the stand-by phase, the stand-by phase is terminated when the input pressure drops below the lower threshold value $S_u$. Furthermore, the stand-by phase is ended when no full braking support function is triggered (see FIG. 5) within a specified time interval.

Figure 6:
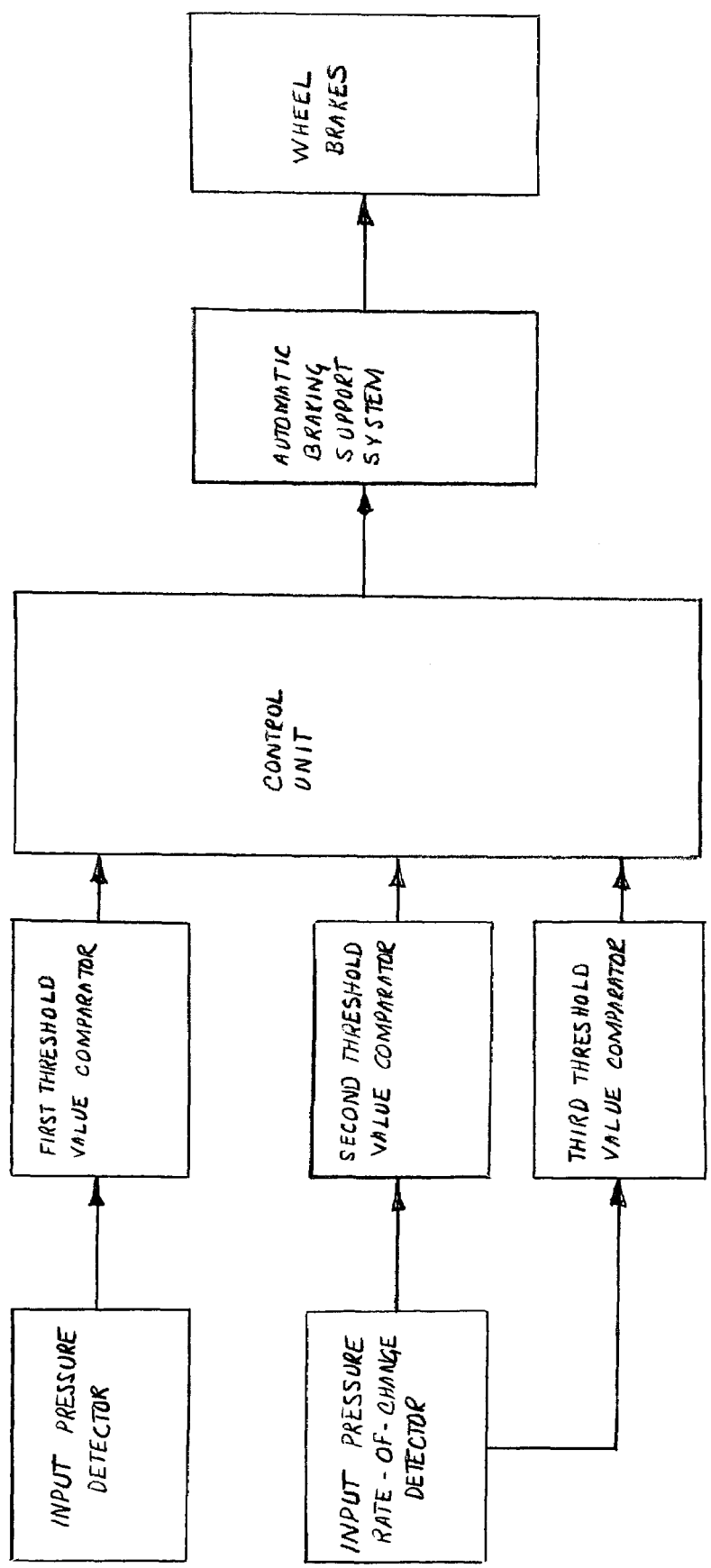
FIG. 6 is a graph of a pressure factor curve for the brake system control device pursuant to the present invention.

The threshold values for the rate of change of the input pressure are correlated, for example, through a pressure factor $k_p$ with the absolute input pressure. The pressure factor curve indicated in FIG. 6 serves as an example for this purpose. Based on the shown pressure factor curve, the threshold values S2 and SB, for example, are calculated as follows:

$$S2_{neu} = S2_{Standard} \cdot k_p$$

$$SB_{neu} = SB_{standard} \cdot k_p$$

The values marked with the index "standard" are hereby the base values specified for the non-actuated state. The threshold value SA is preferably specified as a fixed value. Alternatively, SA is dependent upon the respective braking situation (e.g., current input pressure).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for controlling a vehicle brake system, comprising:
    initiating a full braking support operation as a function of exceeding a first threshold value for an input pressure and as a function of exceeding a second threshold value for a rate of change of the input pressure prior to determining whether another threshold value is exceeded,
    transitioning into the full braking support operation via a stand-by phase upon exceeding a third threshold value for the rate of change of the input pressure, wherein the third threshold value is smaller than the second threshold value, and in the stand-by phase of the full braking support operation, comparing the rate of change of the input pressure upon an overshooting of the input pressure subsiding to a fourth threshold value and having the full braking support operation occur as a function of exceeding the fourth threshold value.

2. Method according claim 1, wherein in lieu of the full braking support operation, the input pressure is increased by a factor and is passed on to wheel brakes.

3. Method according to claim 2, wherein the factor is one of constant and variable as a function of the input pressure level.

4. Method according to claim 1, wherein the stand-by phase remains in a normal braking mode when the fourth threshold value is not exceeded.

5. Device for controlling the brake system of a vehicle, comprising an input pressure detection device;
a device for detecting a rate of change of the input pressure;
a first device for comparing the detected input pressure with a first threshold value;
a second device for comparing the detected rate of change of the input pressure with a second threshold value;
a third device for comparing the detected rate of change of the input pressure with a third threshold value greater than zero; and
a control unit configured to initiate a full braking support operation as a function of exceeding the first threshold value and as a function of exceeding the second threshold value prior to determining whether another threshold value is exceeded, and to initiate a stand-by phase of a braking support function if the first threshold value is exceeded, when the rate of change of input pressure is greater than the third threshold value, but smaller than the second threshold value.

6. Device according to claim 5, further comprising a fourth device for comparing the detected rate of change of input pressure with a fourth threshold value after an overshooting of the input pressure subsides, wherein upon exceeding the fourth threshold value the stand-by phase is changed into a full braking support operation.

7. Device according to claim 6, wherein upon non-exceeding of the fourth threshold value the stand-by phase remains in a normal braking state.

* * * * *